April 10, 1962 W. H. HEISER 3,029,310

FREQUENCY-CONTROLLED SWITCH

Filed Aug. 3, 1956

INVENTOR
WILLIAM H. HEISER
BY Percy P. Lantzy
ATTORNEY

United States Patent Office 3,029,310
Patented Apr. 10, 1962

3,029,310
FREQUENCY-CONTROLLED SWITCH

William H. Heiser, Ramsey, N.J., assignor to International Telephone and Telegraph Corporation, Nutley, N.J., a corporation of Maryland Filed Aug. 3, 1956, Ser. No. 601,974
17 Claims. (Cl. 179—15)

This invention relates, in general, to electronic switching apparatus and in particular, to a frequency-controlled switch for passing to an output channel any one of several signals appearing at several input channels.

Electronic switches have found great utility in multiplex voltage sampling, telemetering, computers, and communications to mention a few of the applications. The present invention finds utility in all of these fields and in a relatively new field of analog-to-digital translation.

In many of the above-mentioned fields there is generally a multiplicity of voltages to be either measured, or transmitted. It is usually a requisite to pass the voltages on in some ordered fashion such that the electronic circuit is analogous to a mechanical commutator which selects each channel as its brush passes the appropriate segment of the commutator ring. The circuit designs have followed this analogy and have been provided with counting means and resetting means so that with each advance of the counter a new line is selected. A somewhat popular arrangement of this circuit is the cascading of multivibrators in the form of counters which count to as high a number as there are input lines, and with each flip-flop operation the output channel is conditioned for the reception of a signal from a new input line.

An object of the present invention is to provide a circuit which can pass any one of a number of signals appearing on a number of input channels to a common output channel in either an ordered commutator fashion or in a random or arbitrary fashion.

A second object of this invention is to provide a circuit which has as the control element of the switching operation the frequency of the control signal rather than the amplitude or the number of pulses of the control signal.

The objects of this invention are obtained by arranging the circuitry so that each of the plurality of input lines has an associated frequency-sensitive circuit which is responsive to a particular frequency. A variable frequency signal source is connected to the circuit and this source may be a random signal that is being monitored or a controlled variable frequency signal generating device. Each of the frequency-sensitive circuits includes a resonant circuit which at its resonant frequency causes a voltage shift. This aforementioned voltage shift permits the electronic valve of the output channel to be conditioned so as to be responsive to the signals appearing on the associated input channel and hence the input signals are transmitted to the output channel.

The above mentioned and other features and objects of this invention will become more apparent by reference to the following description taken in conjunction with the accompanying drawings, in which.

Figure 1:
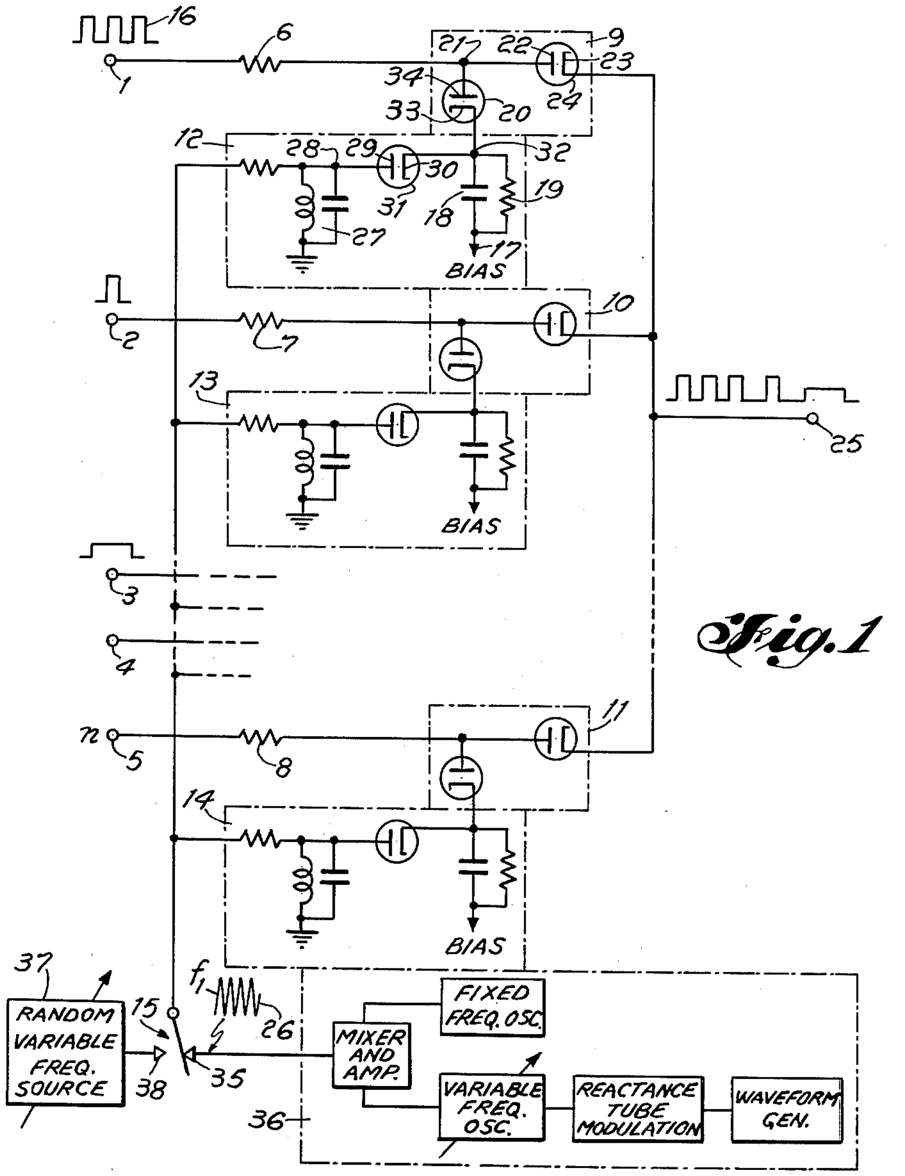
FIG. 1 is a combination schematic and block diagram.

Referring to FIG. 1 there is a plurality of input terminals shown at 1, 2, 3, 4 and 5. To each of these input lines there is connected a resistance as shown at 6, 7 and 8 which serves to give a voltage distribution during the circuit operation. There is also a plurality of electronic valve devices as shown at 9, 10 and 11 each of which has two diodes, for example, diodes 20, 24 for electronic device 9 whose anodes are connected to each other. The cathode of one of these diodes is connected to the output channel thereby making a series connection between the output channel and the input channel. The cathode of the other diode is connected to its associated frequency-sensitive circuit of which there is also provided a plurality as shown at 12, 13 and 14. Each of these frequency-sensitive circuits has a parallel resistance-capacitance circuit, a diode, a parallel resonant circuit and a resistance. The parallel resistance-capacitance circuit is joined at a common point with the cathode of the diode belonging to the frequency-sensitive circuit and the cathode of the diode belonging to the electronic valve as described before. The common point of the parallel resistance-capacitance circuit away from the aforementioned cathode is connected to a biased source. The anode of the frequency-sensitive circuit diode 31 is coupled to the parallel resonant circuit and the aforementioned resistance at a common point. The resistance point away from the parallel resonant circuit is connected to either the controlled variable frequency generating device or a random variable frequency source depending on the position of the movable arm of switch 15. The operation of the invention becomes more understandable from the detailed description which follows.

Figure 2:
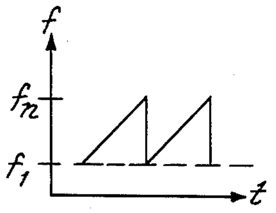
FIG. 2 is a graphic description of a signal which may be used with the invention.

In FIG. 1, the input terminal 1, is subjected to the signal pulses shown at 16. Because of the bias applied at point 17, there is, in essence, set up a short circuit path for these pulses through the parallel connected condenser 18 and resistance 19, on through diode 20 and resistance 6. The current flow through this above-mentioned circuit causes the potential at point 21 and hence, on anode 22 to be relatively negative with respect to cathode 23. It becomes clear that so long as there is current flow through the parallel resistance-capacitance circuit and through diode 20 and resistance 6 there will be no current flow through diode 24 and hence no output signal at 25 which resembles signal 16. Let us assume that a signal of frequency $f_1$, as shown at 26, is passed to the tank circuit 27. Make a second assumption that the resonant circuit at 27 is brought to resonance by $f_1$, then the impedance across the resonant circuit becomes high and hence, the potential at point 28 and the anode 29 becomes positive with relation to the cathode 30. The shift in potential causes diode 31 to conduct, raising the potential at point 32, so that cathode 33 becomes relatively positive with respect to anode 34 and hence, diode 20 does not conduct. With diode 20 not conducting, anode 22 will be responsive to the potential values of signal 16 and the resultant current flow will appear at the output 25. FIG. 1 shows the movable arm of switch 15 connected to point 35 and hence, to a controlled frequency generator device 36. This generating arrangement is capable of generating a signal of variable frequency as shown in FIG. 2 so that the input lines 1 to 5 will sequentially pass signals on to the ouput at 25 as the control frequency signal follows the saw-tooth wave pattern. In FIG. 1 there is also shown a random variable frequency source at 37 which is connected into the circuit when the movable arm of switch 15 is connected to point 38. This random variable frequency source might represent a line of transmission where it is desirous to determine the presence of $f_1$ and it is clear that if $f_1$ were present the signal 16 would be passed to the output channel. The plurality of input channels shown at 1 throuh 5, along with their associated frequency-sensitive circuits and electronic valves such as shown respectively at 12 through 14 and 9 through 11 makes it obvious how a number of signals can be selectively passed to the output channel, depending on the control frequency being transmitted from the variable frequency source.

While I have described above the principles of my invention, in connection with specific apparatus, it is to be clearly understood that this description is made only by way of example and not as a limitation to the scope of my invention, as set forth in the objects thereof and in the accompanying claims.

I claim:

1. A switching system comprising a plurality of parallel, independent inputs of complex electrical waves, a plurality of independent channels respectively connected thereto, an electronic switch connected to each channel, a common output for said channels and means for switching each channel sequentially in response to a different frequency independent of said input waves to pass or exclude its respective complex waves from said common output, said switching means including a common generator of switching frequencies and filters for connecting the common switching generator to each channel, said filters being responsive respectively to a particular frequency in each channel, switching devices connected between each filter and said common output, said common generator being a variable waveform, sweep generator, whose generated frequencies include the respective switching frequencies for each channel, each of said electronic switches comprising a first and second diode, said first diode directly serially coupling said common output with an input channel and said second diode having its anode connected to the anode of said first diode and its cathode connected to the associated one of said filters.

2. A switching system comprising a plurality of parallel, independent inputs of electrical complex waves, a plurality of independent channels respectively connected thereto, an electronic switch connected to each channel, a common output channel for said waves and means for switching each channel sequentially in response to a different frequency independent of said input waves to pass or exclude its respective complex waves from said common output channel, said electronic switch in each channel comprising a pair of diodes connected back to back to each complex wave input, one of the switching diodes being shunted across a channel and coupled to a frequency filter, the second switching diode being connected in series with an input.

3. A switching system comprising a plurality of parallel independent inputs of electrical complex waves, a plurality of independent channels respectively connected thereto, an electronic switch connected to each channel, a common output channel for said waves and means for switching each channel sequentially in response to a different frequency independent of said input waves to pass or exclude its respective complex waves from said common output channel, said switching means including a common generator of switching frequencies and filters for connecting the common switching generator to each channel, said switching generator comprising a waveform generator, variable frequency oscillator, fixed frequency oscillator and a mixer connected between said oscillators.

4. A switching system comprising an input source of electrical pulses of rectangular shape, an output circuit for said pulses, a diode switch connected therebetween, a sawtoothed waveform generator of switching frequencies connected to said diode switch and a frequency sensitive circuit responsive to a single switching frequency connected to said source and diode switch, biasing means connected to said diode switch for shorting said pulses from the output, and an amplitude filter for overcoming said bias means connected between said frequency sensitive circuit and said switch.

5. The switching system of claim 4, wherein the electronic switch comprises two diodes connected back to back between said input and output circuits.

6. The switching system of claim 5, wherein the amplitude filter includes a third diode connected to the biasing means.

7. The switching circuit of claim 5, and a resistance-capacitance circuit connected between the biasing means and the third diode.

8. A switching system comprising a plurality of inputs of complex electrical waves, a plurality of channels respectively connected thereto, an electronic switch coupled in each of said channels, a common output for said channels coupled to each of said electronic switches, a plurality of biasing means each coupled to a different one of said electronic switches for shorting said complex waves from said common output, and means coupled to each of said biasing means to overcome said biasing means in response to a different frequency to regulate the coupling of said complex waves to said common output.

9. A switching system comprising a plurality of inputs of complex electrical waves, a plurality of channels respectively connected thereto, an electronic switch coupled in each of said channels, a common output for said channels coupled to each of said electronic switches, a plurality of biasing means each coupled to a different one of said electronic switches for shorting said complex waves from said common output, means for generating a signal having a plurality of frequencies, and a plurality of means each coupled to an associated one of said biasing means and in common to said generating means to overcome said biasing means in response to a different one of said plurality of frequencies to regulate the coupling of said complex waves to said common output.

10. A switching system comprising a plurality of inputs of complex electrical waves, a plurality of channels respectively connected thereto, an electronic switch coupled in each of said channels, a common output for said channels coupled to each of said electronic switches, a plurality of biasing means each coupled to a different one of said electronic switches for shorting said complex waves from said common output, a swept frequency generator, and a plurality of means each coupled to an associated one of said biasing means and in common to said generator to overcome said biasing means in response to a different frequency of the output signal of said generator to regulate the coupling of said complex waves to said common output.

11. A switching system comprising a plurality of inputs of complex electrical waves, a plurality of channels respectively connected thereto, an electronic switch coupled in each of said channels, a common output for said channels coupled to each of said electronic switches, a plurality of biasing means each coupled to a different one of said electronic switches for shorting said complex waves from said common output, a variable waveform generator, and a plurality of means each coupled to an associated one of said biasing means and in common to said generator to overcome said biasing means in response to a different frequency of the output signal of said generator to regulate the coupling of said complex waves to said common output.

12. A switching system comprising a plurality of inputs of complex electrical waves, a plurality of channels respectively connected thereto, an electronic switch coupled in each of said channels, a common output for said channels coupled to each of said electronic switches, a plurality of biasing means each coupled to a different one of said electronic switches for shorting said complex waves from said common output, means for generating a signal having a plurality of frequencies, a plurality of frequency sensitive means each coupled to a different one of said biasing means, and means coupling each of said frequency sensitive means in common to said generating means, each of said frequency sensitive means responding to a different one of said plurality of frequencies to overcome the shorting of said biasing means to regulate the coupling of said complex waves to said common output.

13. A switching system comprising a plurality of inputs of complex electrical waves, a plurality of channels respectively connected thereto, an electronic switch coupled in each of said channels, a common output for said channels coupled to each of said electronic switches, a plurality of biasing means each coupled to a different one of said electronic switches for shorting said complex waves from said common output, means for generating a signal having a plurality of frequencies, a plurality of frequency sensitive means coupled in common to said generating means each responding to a different one of said plurality of frequencies, and a plurality of amplitude sensitive means each coupling one of said frequency sensitive means to an associated one of said biasing means, each of said amplitude sensitive means responding to the resonance of the associated one of said frequency sensitive means to overcome said biasing means to regulate the coupling of said complex waves to said common output.

14. A switching system comprising a plurality of sources of complex electrical waves, a plurality of electronic switches each including an input terminal, an output terminal and a control terminal, means to couple the input terminal of each of said electronic switches to an associated one of said sources, a common output coupled to the output terminal of each of said electronic switches, a plurality of biasing means each coupled to the control terminal of a different one of said electronic switches for shorting said complex waves from said common output, and means coupled to each of said biasing means to overcome said biasing means in response to a different frequency to regulate the coupling of said complex waves to said common output.

15. A switching system comprising a plurality of sources of complex electrical waves, a plurality of electronic switches each including an input terminal, an output terminal and a control terminal, means coupling the input terminal of each of said electronic switches to an associated one of said sources, a common output coupled to the output terminal of each of said electronic switches, a plurality of biasing means each coupled to the control terminal of a different one of said electronic switches for shorting said complex waves from said common output, means for generating a signal having a plurality of frequencies, and a plurality of means each coupled to a different one of said biasing means and in common to said generating means to overcome said biasing means in response to a different one of said plurality of frequencies to regulate the coupling of said complex waves to said common output.

16. A switching system comprising a plurality of sources of complex electrical waves, a plurality of electronic switches each including an input terminal, an output terminal and a control terminal, means coupling the input terminal of each of said electronic switches to an associated one of said sources, a common output coupled to the output terminal of each of said electronic switches, a plurality of biasing means each coupled to the control terminal of a different one of said electronic switches for shorting said complex waves from said common output, means for generating a signal having a plurality of frequencies, a plurality of frequency sensitive means each coupled to a different one of said biasing means, and means coupling each of said frequency sensitive means in common to said generating means, each of said frequency sensitive means responding to a different one of said plurality of frequencies to overcome said biasing means to regulate the coupling of said complex waves to said common output.

17. A switching system comprising a plurality of sources of complex waves, a plurality of electronic switches each including an input terminal, an output terminal and a control terminal, means to connect the input terminal of each of said electronic switches to an associated one of said sources, a common output coupled to the output terminal of each of said electronic switches, a plurality of biasing means each coupled to the control terminal of a different one of said electronic switches for shorting said complex waves from said common output, means for generating a signal having a plurality of frequencies, a plurality of frequency sensitive means coupled in common to said generating means each responding to a different one of said plurality of frequencies, and a plurality of amplitude sensitive means each coupling one of said frequency sensitive means to a different one of said biasing means, each of said amplitude sensitive means responding to the resonance of the associated one of said frequency sensitive means to overcome said biasing means to regulate the coupling of said complex waves to said common output.

References Cited in the file of this patent

UNITED STATES PATENTS

| | | |
|---|---|---|
| 1,956,397 | McNicolson | Apr. 24, 1934 |
| 2,193,604 | Slepian | Mar. 12, 1940 |
| 2,368,953 | Walsh | Feb. 6, 1945 |
| 2,495,690 | Bradley | Jan. 31, 1950 |
| 2,514,490 | Hanert | July 11, 1950 |
| 2,549,780 | Earp | Apr. 24, 1951 |
| 2,581,056 | Walmsley | Jan. 1, 1952 |
| 2,590,809 | Wallace | Mar. 25, 1952 |
| 2,662,175 | Staal | Dec. 8, 1953 |
| 2,672,512 | Mathes | Mar. 16, 1954 |
| 2,700,101 | Wallace | Jan. 18, 1955 |
| 2,724,049 | Rouault | Nov. 15, 1955 |
| 2,731,512 | Levy | Jan. 17, 1956 |
| 2,829,251 | Patten | Apr. 1, 1958 |
| 2,892,082 | Single | June 23, 1959 |